US012661735B2

(12) United States Patent
Park et al.

(10) Patent No.: US 12,661,735 B2
(45) Date of Patent: Jun. 23, 2026

(54) ARC WELDING DEVICE FOR SECONDARY BATTERY, AND WELDING METHOD USING THE SAME

(71) Applicant: LG Energy Solution, Ltd., Seoul (KR)

(72) Inventors: Jung Hyun Park, Daejeon (KR); Tae Su Kim, Daejeon (KR); Beom Seok Lee, Daejeon (KR); Hyuk Soo Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 573 days.

(21) Appl. No.: 18/272,139

(22) PCT Filed: Feb. 16, 2022

(86) PCT No.: PCT/KR2022/002288
§ 371 (c)(1),
(2) Date: Jul. 13, 2023

(87) PCT Pub. No.: WO2022/177289
PCT Pub. Date: Aug. 25, 2022

(65) Prior Publication Data
US 2024/0139850 A1 May 2, 2024

(30) Foreign Application Priority Data

Feb. 19, 2021 (KR) ........................ 10-2021-0022437

(51) Int. Cl.
*B23K 9/167* (2006.01)
*H01M 50/536* (2021.01)

(52) U.S. Cl.
CPC ......... *B23K 9/1675* (2013.01); *H01M 50/536* (2021.01)

(58) Field of Classification Search
None
See application file for complete search history.

(56) References Cited

U.S. PATENT DOCUMENTS

| | | | | | |
|---|---|---|---|---|---|
| 2,755,199 | A | * | 7/1956 | Rossheim | B22F 7/04 427/365 |
| 2,828,406 | A | * | 3/1958 | Kinkead | H05B 6/104 219/76.1 |
| 3,582,599 | A | * | 6/1971 | Yohn | B23K 9/186 219/60 R |
| 3,641,309 | A | | 2/1972 | Klebel | |
| 3,679,858 | A | * | 7/1972 | Bollinger | B23K 9/048 219/137 R |

(Continued)

FOREIGN PATENT DOCUMENTS

| | | |
|---|---|---|
| CN | 1131072 A | 9/1996 |
| CN | 106141387 A | 11/2016 |

(Continued)

OTHER PUBLICATIONS

Extended European Search Report including Written Opinion for Application No. 22756487.9 dated Apr. 22, 2024, pp. 1-7.

(Continued)

*Primary Examiner* — Thor S Campbell
(74) *Attorney, Agent, or Firm* — Lerner David LLP

(57) ABSTRACT

An arc welding device for a secondary battery according to an embodiment of the present invention includes an upper fixing portion in which a plurality of welding electrode units connected to one pole of a welding power are disposed and a lower fixing portion disposed to face the upper fixing portion with an object to be welded therebetween and connected to the other pole of the welding power. The upper fixing portion includes a first facing surface facing the object to be welded and formed to be concave toward the object to be welded and the lower fixing portion includes a second facing surface facing the first facing face and formed to be convex to correspond to the concave shape of the first facing surface.

11 Claims, 3 Drawing Sheets

(56)                References Cited

U.S. PATENT DOCUMENTS

| | | | | |
|---|---|---|---|---|
| 3,936,654 | A * | 2/1976 | Cannata | B23K 9/04 |
| | | | | 219/137.8 |
| 4,336,441 | A * | 6/1982 | Godai | B23K 35/3066 |
| | | | | 219/137 WM |
| 4,341,944 | A | 7/1982 | Breen | |
| 6,320,303 | B1 * | 11/2001 | Noji | H01J 31/501 |
| | | | | 313/527 |
| 6,770,834 | B1 * | 8/2004 | Deshotel | B23K 37/06 |
| | | | | 228/5.7 |
| 2009/0218323 | A1 | 9/2009 | Abe et al. | |
| 2010/0326963 | A1 | 12/2010 | Peters et al. | |
| 2011/0117420 | A1 | 5/2011 | Kim et al. | |
| 2015/0213967 | A1 | 7/2015 | Yokouchi et al. | |
| 2018/0169790 | A1 | 6/2018 | Jin et al. | |
| 2022/0037945 | A1 * | 2/2022 | Koshiba | H02K 15/064 |
| 2024/0139850 | A1 * | 5/2024 | Park | H01M 50/536 |
| 2025/0178114 | A1 * | 6/2025 | Mori | B23K 9/125 |
| 2026/0001157 | A1 * | 1/2026 | Takada | B23K 9/124 |

FOREIGN PATENT DOCUMENTS

| | | | |
|---|---|---|---|
| CN | 107848071 A | 3/2018 | |
| GB | 743806 A | 1/1956 | |
| JP | H038574 A | 1/1991 | |
| JP | H0688132 B2 | 11/1994 | |
| JP | 2001105140 A | 4/2001 | |
| JP | 2007061830 A | 3/2007 | |
| JP | 2008200750 A | 9/2008 | |
| JP | 4347652 B2 | 10/2009 | |
| JP | 2013099793 A | 5/2013 | |
| JP | 5578920 B2 | 8/2014 | |
| JP | 6383319 B2 | 8/2018 | |
| KR | 100265296 B1 | 9/2000 | |
| KR | 20130042954 A | 4/2013 | |
| KR | 101364287 B1 | 2/2014 | |
| KR | 101418899 B1 | 7/2014 | |
| KR | 101452878 B1 | 10/2014 | |
| KR | 20190077757 A | 7/2019 | |
| WO | WO-2022177289 A1 * | 8/2022 | B23K 9/1006 |

OTHER PUBLICATIONS

International Search Report for PCT/KR2022/002288 mailed May 23, 2022. 3 pgs.
Search Report dated Dec. 30, 2025 from the Office Action for Chinese Application No. 202280008488.5 issued Dec. 31, 2025, 3 pages.

* cited by examiner

<u>130</u>

ARC WELDING DEVICE FOR SECONDARY BATTERY, AND WELDING METHOD USING THE SAME

CROSS-REFERENCE TO RELATED APPLICATION(S)

The present application is a national phase entry under 35 U.S.C. § 371 of International Application No. PCT/KR2022/002288 filed on Feb. 16, 2022 which claims priority from Korean Patent Application No. 10-2021-0022437 filed on Feb. 19, 2021, all of which are incorporated herein by reference.

TECHNICAL FIELD

The present disclosure relates to an arc welding device for a secondary battery and a welding method using the same, and more particularly, to a welding device and method for applying arc welding in the case of welding an electrode tab and an electrode lead of a secondary battery.

BACKGROUND ART

Recently, an increase in the price of an energy source and an interest in environmental pollution due to the depletion of fossil fuels have increased, demand for an eco-friendly alternative energy source has become an indispensable factor for future life. Accordingly, research on various power production technologies such as nuclear power, solar power, wind power, and tidal power has continued and power storage devices for using the produced energy more efficiently have been focused.

In particular, as technology development and demand for mobile devices has increased, demand for batteries as an energy source has rapidly increased, and accordingly, a lot of research on batteries that may meet various needs has been conducted.

Typically, there is high demand for lithium secondary batteries, such as lithium ion batteries and lithium ion polymer batteries, which have advantages such as high energy density, discharge voltage, and output stability.

Secondary batteries may also be classified according to the structure of an electrode assembly in which a positive electrode, a negative electrode, and a separator interposed between the positive and negative electrodes are stacked. Typically, a jelly roll-type electrode assembly having a structure in which long sheet-shaped positive and negative electrodes are wound with a separator interposed therebetween, a stack-type electrode assembly in which a plurality of positive and negative electrodes cut into units having a predetermined size are sequentially stacked with a separator interposed therebetween, and the like may be listed. Recently, in order to solve the problems of the jelly roll-type electrode assembly and the stack-type electrode assembly, a stack/folding-type electrode assembly having a structure in which unit cells with positive and negative electrodes of a predetermined unit stacked with a separator interposed therebetween are located on a separation film and sequentially wound, as a mixed type of the jelly roll type and the stack type, has been developed.

In addition, depending on a shape of a case, secondary batteries may be classified into a cylindrical secondary battery in which an electrode assembly is built in a cylindrical case, a prismatic secondary battery in which an electrode assembly is built in a prismatic case, and a pouch-type secondary battery in which an electrode assembly is built in a pouch-type case of a laminate sheet.

In the case of the widely used pouch-type secondary batteries, an electrode assembly in which a positive electrode, a negative electrode, and a separator disposed therebetween are stacked is accommodated in a pouch-type case. Here, the plurality of electrode tabs connected to the respective electrodes are connected to an electrode lead by welding and electrically connected to an external component through an electrode lead exposed to the outside.

When the electrode tab and the electrode lead are bonded, a welding method, specifically, an ultrasonic welding method and a laser welding method are generally used. However, in the case of ultrasonic welding applied here, fine metal foreign matter may occur due to friction with an oxide film during a welding process, and when the corresponding foreign matter is attached to a secondary battery, a short circuit defect may occur. In addition, even in the case of laser welding, which is widely used recently to avoid the disadvantages of ultrasonic welding, there is a problem of short-circuit failure due to spatter occurring during welding, and frequent replacement of jig or nozzle is required as these spatters are accumulated.

DISCLOSURE

Technical Problem

An object of an exemplary embodiment of the present invention is to provide an arc welding device for a secondary battery and a welding method using the same, which may increase welding reliability, while reducing welding cost, without the occurrence of spatter in the case of welding an electrode tab and an electrode lead of a secondary battery.

The problem to be solved by the present disclosure is not limited to the aforementioned problems, and the problems not mentioned will be clearly understood by those of ordinary skill in the art to which the present disclosure pertains from the present specification and the accompanying drawings.

Technical Solution

An arc welding device for a secondary battery according to an exemplary embodiment of the present invention includes an upper fixing portion in which a plurality of welding electrode units connected to one pole of a welding power are disposed and a lower fixing portion disposed to face the upper fixing portion with an object to be welded therebetween and connected to the other pole of the welding power, wherein the upper fixing portion includes a first facing surface facing the object to be welded and formed to be concave toward the object to be welded, the lower fixing portion includes a second facing surface facing the first facing face and formed to be convex to correspond to the concave shape of the first facing surface.

An arc may be generated between the plurality of welding electrode units and the lower fixing portion by the supply of the welding power.

The first facing surface may include a plurality of arc holes corresponding to the plurality of welding electrode units.

The arc welding device may further include a first nozzle portion supplying an inert gas to an inside of the upper fixing portion.

A plurality of gas supply holes may be formed in the second facing surface of the lower fixing portion, and the arc welding device may further include a second nozzle portion supplying an inert gas to an inside of the lower fixing portion.

The object to be welded may be an electrode tab and an electrode lead of the secondary battery.

The upper fixing portion may include one or more materials selected from copper, a copper-based alloy, ceramic, and quartz.

The plurality of welding electrode units may include a plurality of tungsten electrodes.

A welding method according to another exemplary embodiment of the present invention, as a welding method using the aforementioned arc welding device for a secondary battery, includes: preparing an electrode assembly including a plurality of electrode tabs protruding to the outside, disposing the electrode tab and the electrode lead between the upper fixing portion and the lower fixing portion, adhering the first facing surface and the second facing surface to each other with the electrode tab and the electrode lead interposed therebetween, and generating an arc between the welding electrode unit and the lower fixing portion to perform gas tungsten arc welding (GTAW).

In the performing of the GTAW, a range of a base current supplied to the plurality of welding electrode units may be 2 A to 4 A, and a range of a peak current may be 4 A to 10 A.

The GTAW may be performed as pulse welding having a frequency of 2000 Hz or higher.

Advantageous Effects

According to the exemplary embodiments, the arc welding device for a secondary battery and the welding method using the same, which may increase welding reliability, while reducing welding costs, without causing spatter, when welding an electrode tab and an electrode lead of a secondary battery.

Aspects of the present invention are not limited to the aforementioned disclosure, and aspects not mentioned will be clearly understood by those of ordinary skill in the art to which the present disclosure pertains from the present specification and accompanying drawings.

DETAILED DESCRIPTION

Figure 1A:
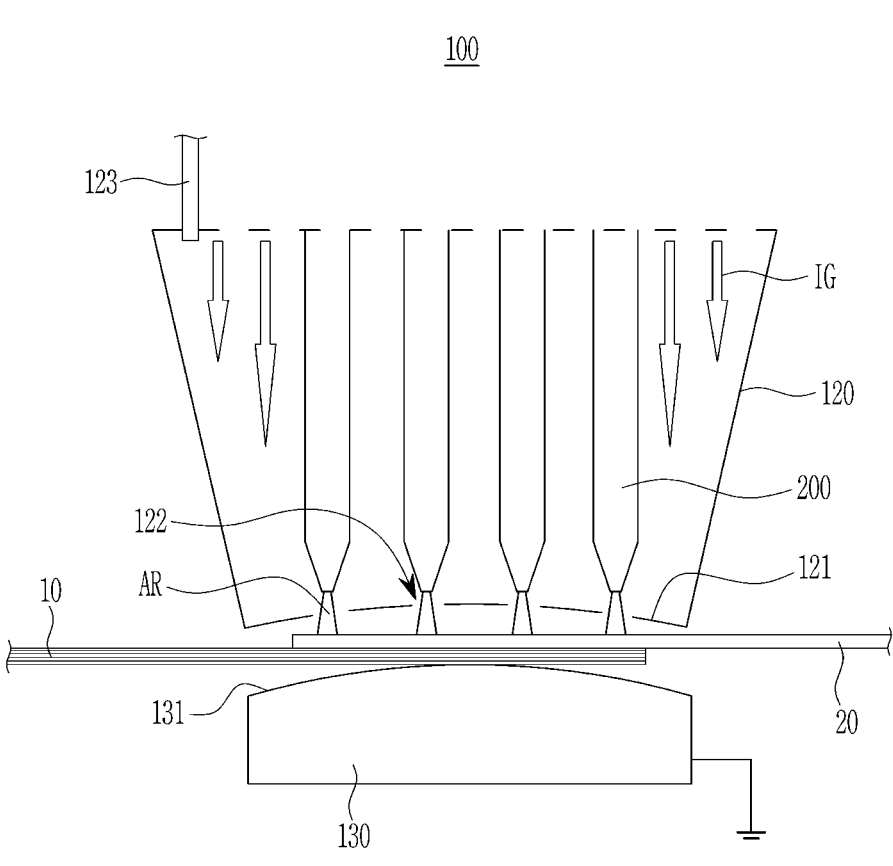
FIGS. 1A and 1B are diagrams illustrating a schematic configuration of an arc welding device for a secondary battery according to an exemplary embodiment of the present invention.

Hereinafter, exemplary embodiments of the present invention will be described in detail with reference to the accompanying drawings to allow those skilled in the art to practice the present technology. Exemplary embodiments of the present invention may be implemented in various different forms and is not limited to the examples as described herein.

Portions unrelated to the description may be omitted in order to more clearly describe exemplary embodiments of the present invention, and the same or similar components may be denoted by the same reference numerals throughout the present specification.

Further, the size and thickness of each component shown in the drawings may be arbitrarily shown for convenience of explanation, and therefore, the present technology is not necessarily limited to the shown exemplary embodiments in the drawings. In the drawings, the thickness of various layers, regions, etc., may be exaggerated for clarity. In the drawings, the thickness of partial layers and regions may be exaggerated for convenience of explanation.

In addition, unless explicitly described to the contrary, the word "comprise", and variations such as "comprises" or "comprising", will be understood to imply the inclusion of stated elements but not the exclusion of any other elements.

Throughout the specification, when it is referred to "in plan view", it means that a target element is viewed from above, and when it is referred to "in cross-sectional view", it means that a target element taken vertically is viewed from the side.

Hereinafter, a welding device for a secondary battery and a welding method using the same according to an exemplary embodiment of the present invention will be described with reference to FIGS. 1A, 1B, and 2.

Figure 1B:
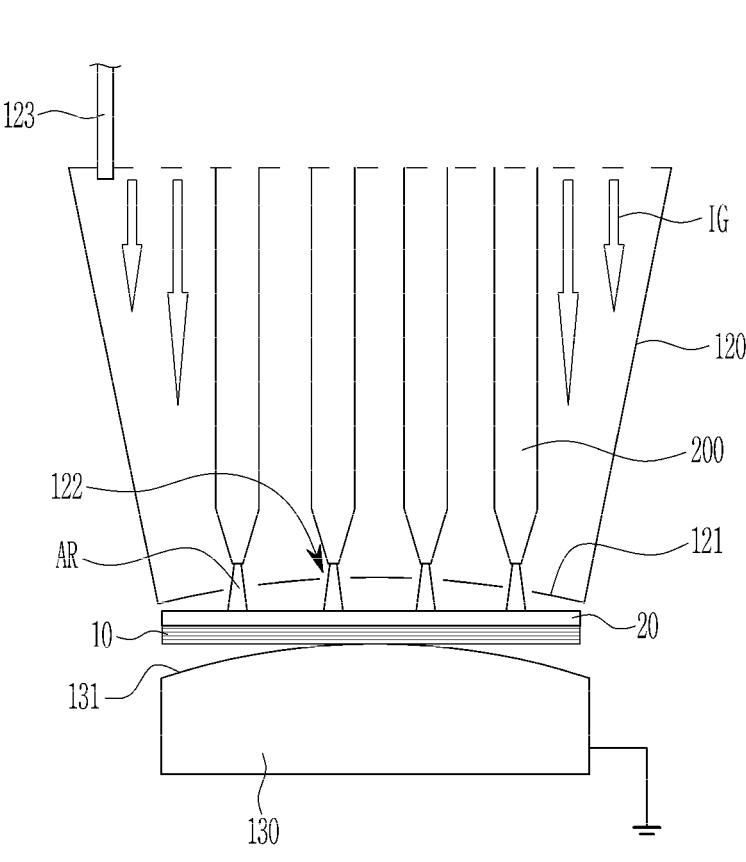

FIGS. 1A and 1B are diagrams illustrating a schematic configuration of an arc welding device for a secondary battery according to an exemplary embodiment of the present invention. FIG. 2 is an enlarged view showing a configuration of a lower fixing portion in FIGS. 1A and 1B.

Figure 2:
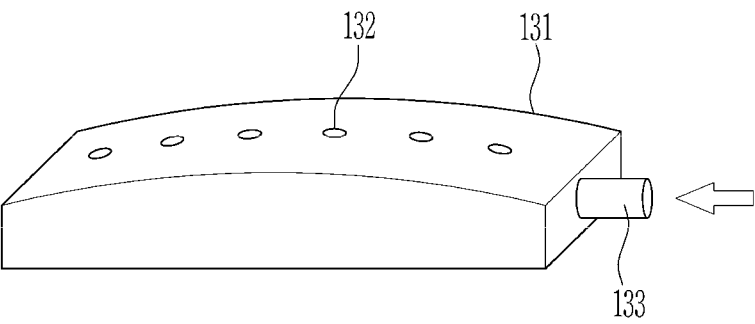
FIG. 2 is an enlarged view showing a configuration of a lower fixing portion in FIGS. 1A and 1B.

Referring to FIGS. 1A and 1B and 2, an arc welding device 100 for a secondary battery according to an exemplary embodiment of the present invention is a welding device 100 for bonding a plurality of electrode tabs 10 and an electrode lead 20 connected to an electrode of an electrode assembly and includes an upper fixing portion 120 and a lower fixing portion 130 disposed with the electrode tab 10 and the electrode lead 20 interposed therebetween.

In particular, the arc welding device 100 for a secondary battery is a device for arc welding, not a configuration for ultrasonic welding or laser welding used for bonding the electrode tab 10 and the electrode lead 20 in the related art. In general, arc welding, also called gas tungsten arc welding, is a welding method in which a base material is melted and joined by arc heat generated using a tungsten electrode. Here, since inert gas such as Ar or He is used as a protective gas, the arc welding is also called tungsten inert gas welding.

The arc welding device 100 for a secondary battery according to an exemplary embodiment of the present invention allows this arc welding method to be applied to a welding method for bonding the electrode tab 10 and the electrode lead 20 to prevent an occurrence of spatter and foreign matter and damage to a battery.

The upper fixing portion 120 includes a plurality of welding electrode units 200 connected to one pole of a welding power (not shown) therein. The welding electrode unit 200 may be a tungsten electrode, and may be disposed inside the upper fixing portion 120 such that an end thereof communicates with the outside through an arc hole 122 formed in the first facing surface 121 of the upper fixing portion 120. Power may be supplied through the welding electrode unit 200 to generate an arc AR. The tungsten electrode constituting the welding electrode unit 200 may include zirconia-based or lanthanide-based tungsten, but is not particularly limited.

A first facing surface 121 formed to be concave toward an object to be welded, that is, the electrode lead 20 and the electrode tab 10, may be formed below the upper fixing portion 120. The first facing surface 121 may be in close contact with a second facing surface 131 of the lower fixing portion 130, which will be described later, to reliably fix the electrode lead 20 and the electrode tab 10, which are to be welded, during welding and minimize a gap therebetween.

In addition, the upper fixing portion 120 may be formed in a chamber shape in which the welding electrode unit 200 is disposed, and the upper fixing portion 120 may further include a first nozzle portion 123 for supplying an inert gas IG at an upper portion thereof. The inert gas IG is supplied through the first nozzle portion 123 and passes through the inside of the upper fixing portion 120 to act as a shielding gas during welding through the arc hole 122 described above. As the shielding gas, a single or mixed gas selected from Ar, He, N₂, etc. may be used, but is not particularly limited. As the inert gas IG is supplied to a welding portion during welding through the upper fixing portion 120, contact of the welding portion with oxygen may be blocked. In an exemplary embodiment of the present invention, such a structure may be simply provided through the upper fixing portion 120.

The upper fixing portion 120 may include one or more materials selected from copper, a copper-based alloy, ceramic, and quartz. Accordingly, even if heat generated by the arc increases during arc welding, cooling may be performed quickly to enable repeated work, and since the material has heat resistance, it may be appropriately applied to arc welding.

The lower fixing portion 130 connected to the other pole of the welding power with the object to be welded interposed therebetween is disposed below the upper fixing portion 120. The lower fixing portion 130 includes a second facing surface 131 facing the first facing surface 121 and formed to be convex to correspond to the concave shape of the first facing surface 121. On the second facing surface 131, the electrode tab 10 and the electrode lead 20 to be welded are disposed. An arrangement direction of the electrode tab 10 and the electrode lead 20 is not particularly limited. That is, as shown in FIG. 1A, the electrode tab 10 and the electrode lead 20 may be arranged such that convex shapes thereof correspond to each other in a length direction, or, as shown in FIG. 1B, the electrode tab 10 and the electrode lead 20 may be arranged in a width direction. In addition, even if the shape of each of the electrode tab 10 and the electrode lead 20 is bent to correspond to a shape of a contact surface of the fixing portions 120 and 130 during the welding process, additional shaping may be performed to have an appropriate shape by a subsequent pressing process, etc., and thus, such bending may not affect weld quality or performance of a final product.

The electrode tab 10 and the electrode lead 20 to be welded may be disposed on the second facing surface 131, the first facing surface 121 of the upper fixing portion 120 may be brought into close contact with the second facing surface 131 to perform arc welding, and accordingly, a gap between the electrode tab 10 and the electrode lead 20 may be minimized and the electrode tab 10 and the electrode lead 20 may be stably supported during welding, whereby arc welding may be easily applied to the electrode tab 10 and the electrode lead 20 as well.

Meanwhile, as shown in FIG. 2, a plurality of gas supply holes 132 may be further formed on the second facing surface 131. In addition, a second nozzle portion 133 communicating with the inside of the lower fixing portion 130 may be further provided to supply inert gas therethrough. The inert gas may be supplied through the gas supply hole 132 to further improve adhesion between the objects to be welded and block contact thereof with oxygen during welding.

The lower fixing portion 130 may include copper or a copper-based alloy having good thermal conductivity. Thereby, rapid cooling may be achieved, but the present technology is not limited thereto.

As described above, when the welding device 100 for a secondary battery according to an exemplary embodiment of the present invention is used, arc welding that does not cause spatter may be applied in the bonding of the electrode tab 10 and the electrode lead 20 of the secondary battery, and as a result, the welding device may be simplified without adding an additional device (such as a suction device) for removing spatter, and a secondary battery may be manufactured without causing short circuit defects due to spatter. In addition, the welding electrode unit is included in the upper fixing portion, the upper fixing portion may serve as a fixing jig by itself together with the lower fixing portion, and the inert gas IG may also be easily supplied through the upper fixing portion, and therefore, costs for configuring the corresponding facility may be low to reduce overall equipment investment costs and suppress the occurrence of defects, thereby significantly improving the process efficiency.

Meanwhile, in another exemplary embodiment of the present invention, there is provided a welding method using the aforementioned welding device for a secondary battery.

That is, in the electrode assembly in which a positive electrode, a negative electrode, and a separator disposed between the positive electrode and the negative electrode are stacked, a plurality of electrode tabs connected to the respective electrodes and protruding outward and the electrode leads are aligned and disposed on the upper fixing portion 120 and the lower fixing portion 130. Thereafter, the first facing surface 121 of the upper fixing portion 120 and the second facing surface 131 of the lower fixing portion 130 are brought into close contact with each other with the electrode tab 10 and the electrode lead 20 interposed therebetween.

At this time, as described above, since the first facing surface 121 has a concave shape and the second facing surface 131 has a convex shape to correspond thereto, adhesion between the electrode lead 20 and the electrode tab 10 disposed therebetween may be improved and the electrode lead 20 and the electrode tab 10 may be fixed more stably.

Subsequently, power is supplied to generate an arc AR between the welding electrode unit 200 and the lower fixing portion 130, and welding (i.e., gas tungsten arc welding (GTAW)) is performed by the generated arc AR. That is, in a state in which the upper fixing portion 120 is in close contact with the electrode lead 20 and the electrode tab 10, the welding electrode unit 200 is close to the object to be welded, and in this state, power is supplied to generate the arc AR so that a base material may be melted and welding is performed.

At this time, the supplied power may have a base current in a range of 2 A to 4 A, and a peak current may be in a range of 4 A to 10 A. If the current value is smaller than this range, welding may not be sufficiently performed, and if the current value is larger, damage to the electrode lead 20 and the electrode tab 10 may occur. In particular, in the exemplary embodiment of the present invention, by supplying a relatively small base current and at the same time supplying a larger peak current, sufficient welding may be performed, without damage to the electrode lead 20 and the electrode tab 10.

In addition, GTAW may be performed as pulse welding having a frequency of 2000 Hz or higher. Accordingly, welding may be performed without damage to the electrode lead 20 and the electrode tab 10.

As described above, according to the exemplary embodiments of the present invention, arc welding may be applied to a welding process for bonding the electrode tab 10 and the electrode lead 20 during the manufacture of a secondary battery, so that welding with high reliability may be performed even with simple facility, without causing spatter, thereby reducing a defect rate during manufacturing and reduce the process cost.

While the present disclosure has been described in connection with exemplary embodiments, it is to be understood that the technology is not limited to the disclosed exemplary embodiments, but, on the contrary, is intended to cover various modifications and equivalent arrangements included within the spirit and scope of the appended claims.

DESCRIPTION OF MAIN ELEMENTS

100: arc welding device for a secondary battery
200: welding electrode unit
120: upper fixing portion
130: lower fixing portion
121: first facing surface
131: second facing surface
10: electrode tab
20: electrode lead

The invention claimed is:

1. An arc welding device for a secondary battery, the arc welding device comprising:
  an upper fixing portion, the upper fixing portion including a plurality of welding electrode units, the plurality of welding electrode units being connected to a first pole of a welding power; and
  a lower fixing portion disposed to face the upper fixing portion, wherein the lower facing portion is connected to a second pole of the welding power, wherein an object to be welded is configured to be disposed between the upper fixing portion and the lower fixing portion;
  wherein the upper fixing portion includes a first facing surface, the first facing surface being concave and the first facing surface being configured to face the object to be welded, and
  wherein the lower fixing portion includes a second facing surface, the second facing surface being convex, the convex second facing surface being configured to correspond to the concave shape of the first facing surface and the second facing surface being configured to face the first facing surface.

2. The arc welding device of claim 1, wherein:
the arc welding device is configured to generate an arc between the plurality of welding electrode units and the lower fixing portion by supplying welding power.

3. The arc welding device of claim 1, wherein:
the first facing surface includes a plurality of arc holes, the plurality of arc holes being configured to correspond to a position of the plurality of welding electrode units, wherein the plurality of arc holes are configured to allow passage of the arc.

4. The arc welding device of claim 1, further comprising:
a first nozzle unit configured to supply an inert gas to an interior of the upper fixing portion.

5. The arc welding device of claim 1, wherein:
a plurality of gas supply holes are disposed in the second facing surface of the lower fixing portion,
wherein the arc welding device further comprises a second nozzle unit configured to supply an inert gas to an interior of the lower fixing portion.

6. The arc welding device of claim 1, wherein:
the object to be welded includes an electrode tab and an electrode lead.

7. The arc welding device of claim 1, wherein:
the upper fixing portion includes one or more of copper, a copper-based alloy, ceramic, or quartz.

8. The arc welding device of claim 1, wherein:
the plurality of welding electrode units includes a plurality of tungsten electrodes.

9. A welding method using the arc welding device of claim 1, the welding method comprising:
preparing an electrode assembly including a plurality of electrode tabs,
disposing the plurality of electrode tabs and an electrode lead between the upper fixing portion and the lower fixing portion;
positioning the first facing surface of the upper fixing portion and the second facing surface of the lower facing portion to face each other, wherein the plurality of electrode tabs and the electrode lead are interposed therebetween; and
generating an arc between the plurality of welding electrode units and the lower fixing portion to perform gas tungsten arc welding.

10. The welding method of claim 9, wherein:
in the performing of the gas tungsten arc welding, a range of a base current supplied to the plurality of welding electrode units is from 2 A to 4 A, and a range of a peak current is from 4 A to 10 A.

11. The welding method of claim 10, wherein:
the gas tungsten arc welding is performed as pulse welding having a frequency of 2000 Hz or higher.

* * * * *